United States Patent [19]

Prochazka

[11] 4,041,117

[45] Aug. 9, 1977

[54] SILICON CARBIDE SINTERED BODY

[75] Inventor: Svante Prochazka, Ballston Lake, N.Y.

[73] Assignee: General Electric Company, Schenectady, N.Y.

[21] Appl. No.: 698,483

[22] Filed: June 21, 1976

Related U.S. Application Data

[62] Division of Ser. No. 591,840, June 30, 1975, abandoned.

[51] Int. Cl.$^2$ .................. C04B 35/56; C04B 35/64
[52] U.S. Cl. ........................... 264/63; 106/44; 264/65
[58] Field of Search .................. 264/65, 63; 106/44

[56] References Cited

U.S. PATENT DOCUMENTS

| | | | |
|---|---|---|---|
| 3,649,310 | 3/1972 | Yates | 106/44 |
| 3,649,342 | 3/1972 | Bartlett | 106/44 |
| 3,725,099 | 4/1973 | Nazik | 106/44 |
| 3,853,566 | 12/1974 | Prochazka | 106/44 |

*Primary Examiner*—Winston A. Douglas
*Assistant Examiner*—Mark Bell
*Attorney, Agent, or Firm*—Jane M. Binkowski; Joseph T. Cohen; Jerome C. Squillaro

[57] ABSTRACT

A silicon carbide sintered body characterized by its microstructural stability at high temperatures is produced by forming a mixture of β-silicon carbide powder, α-silicon carbide seeding powder, boron additive and a carbonaceous additive into a green body and sintering it to produce a sintered body with a density of at least 80% wherein at least 70% by weight of the silicon carbide is α-silicon carbide.

2 Claims, 3 Drawing Figures

SILICON CARBIDE SINTERED BODY

The invention herein described was made in the course of or under a contract or subcontract thereunder (or grant) with the Department of the Navy.

This is a division of application Ser. No. 591,840, filed June 30, 1975, now abandoned.

The chemical and physical properties of silicon carbide make it an excellent material for high temperature structural applications. However, silicon carbide is produced in the form of particles or powder from which dense bodies must be formed and it is the formation and properties of these dense bodies that have represented problems.

Hot pressing of silicon carbide powder has been used to produce small dense bodies under closely controlled conditions. However, hot-pressing methods require high pressures and temperatures necessitating expensive energy consuming machinery equipped with graphite dies. Also, hot-pressing yields pressed bodies in the form of billets of simple geometric shape only which require time-consuming machining to produce a complex shaped part.

Silicon carbide powder along is not sinterable. However, in my copending application, Ser. No. 409,073, filed Oct. 24, 1973, now abandoned, there is disclosed a method of producing a $\beta$-silicon carbide sintered body by forming a mixture of submicron powder composed of $\beta$-silicon carbide, a boron additive and free carbon into a green body and sintering it at a temperature of about 1900°–2100° C.

The onset of exaggerated growth of large tabular $\alpha$-silicon carbide crystals on densification of $\beta$-silicon carbide powders doped with boron is a limitation to obtaining the uniform fine-grained microstructures necessary to withstand fracture, especially at temperatures of the order of about 2000° C. This phenomenon is related to the transformation of $\beta$-silicon carbide into the thermodynamically more stable $\alpha$-SiC phase at temperatures of about 2000° C and higher.

While several means to suppress this kind of grain growth on hot pressing have been devised, none of them is currently applicable to sintering. Thus, for instance, when the hot-pressing temperature is decreased and compensated for by increased pressing pressure, conditions may be found where exaggerated grain growth does not occur. Also various additions such as aluminum, silicon nitride, aluminum nitride, and boron nitride to $\beta$-SiC powder have been proven effective in controlling the growth of tabular $\alpha$ crystals on hot-pressing: these means, however, cannot be used for sintering as they interfere with the densification process and prevent obtaining high densities.

The present process relates to improved grain growth control on sintering of silicon carbide by transforming a substantial mass of the sintering $\beta$-SiC powder to the $\alpha$ form, i.e. into the thermodynamically more stable form, by seeding with an addition of $\alpha$-SiC. The $\alpha$-SiC nuclei thus provided induce a rapid $\beta$ to $\alpha$ transformation during sintering. The growing $\alpha$-SiC grains impinge on each other early in their development, cease to grow and result in a sintered product with a substantially uniform, relatively fine-grained microstructure wherein at least 70% by weight of the silicon carbide present is composed of $\alpha$-SiC in the form of platelets or elongated grains which may range in the long dimension from about 5 to 150 microns, and preferably from about 5 to 25 microns.

The present invention provides a number of advantages. One advantage is that since the present process provides grain growth control, sintering can be carried out through a wide temperature range which is particularly economical and practical since it eliminates the need for critical temperature controls. The second advantage is that the present sintered product has a shape and mechanical properties which do not change significantly through a wide temperature range, i.e. temperatures ranging from substantially below 0° C to temperatures higher than 2300° C.

Those skilled in the art will gain a further and better understanding of the present invention from the detailed description set forth below, considered in conjunction with the figures accompanying and forming a part of the specification, in which.

Figure 1:
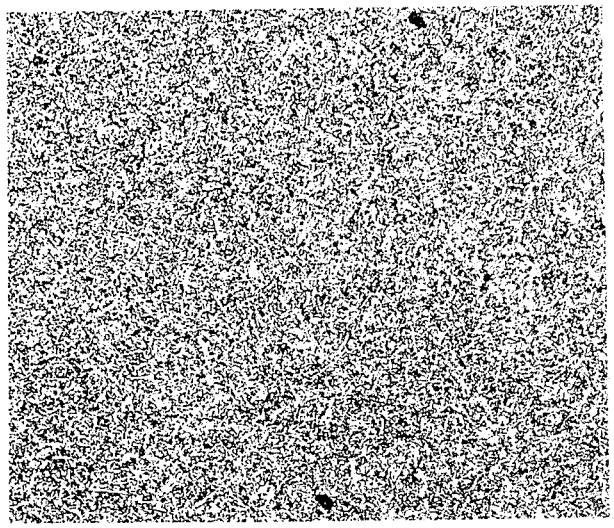
FIG. 1 is a photomicrograph (magnified 500 ×) of an etched specimen produced according to the present invention but without the addition of $\alpha$-SiC, sintered at 2080° C illustrating the uniform microstructure of $\beta$-SiC.

Briefly stated, the process of the present invention comprises provided a substantially homogeneous particulate dispersion or mixture, wherein the particles are submicron in size, of $\beta$-silicon carbide powder, $\alpha$-silicon carbide seeding powder, boron additive and a carbonaceous additive which is free carbon or a carbonaceous organic material which is heat-decomposible to produce free carbon, shaping the mixture into a green body, and sintering the green body at a temperature ranging from about 1950° C to 2300° C in an atmosphere in which the green body and resulting sintered body is substantially inert to produce a sintered body having a density of at least 80% of the theoretical density for silicon carbide and a significantly uniform microstructure wherein at least 70% by weight of the silicon carbide is $\alpha$-SiC.

In the present invention single phase $\beta$-silicon carbide powder is used having an average particle size ranging up to about 0.45 micron, and generally from about 0.05 micron to 0.4 micron. As a practical matter and for best results the $\beta$-SiC powder preferably ranges in size from an average particle size of about 0.1 micron to 0.2 micron. $\beta$-silicon carbide powder of this size can be prepared by a number of techniques as, for example, by direct synthesis from the elements, by reduction of silica, or by pyrolysis of compounds containing silicon and carbon. A number of processes which involve the pyrolysis of silicon compounds and organic compounds to produce silicon and carbon are particularly advantageous since they can be controlled to produce $\beta$-silicon carbide of desired submicron particle size composed mainly of isolated crystallites. Hot plasma techniques are especially preferred for producing the powders useful in the present invention. The final product generally requires leaching, especially with acid to remove any silicon which may be present, to produce a sinterable phase pure β-silicon carbide powder.

In the present process, to achieve the desired grain growth control, the particle size of the α-SiC seed powder should be at least about twice as large as the average particle size of the β-SiC. Also, the α-SiC seed powder is always submicron in size, and generally has a particle size ranging from about 0.1 micron to about 0.6 micron. All polytype compositions of the α-SiC are operable in the present invention.

The present fine-sized α-SiC can be prepared by a number of techniques. For example, abrasive grade silicon carbide, which is always totally α-SiC, can be milled and the milled powder admixed with a liquid such as water to separate fractions of large and fine-sized particles by sedimentation. Specifically, the large-sized particles are allowed to settle and the liquid in which the desired finer-sized particles float is decanted and evaporated to yield the fine-sized, submicron particle fraction.

The α-SiC powder is used in amounts ranging from about 0.05% by weight to 5% by weight based on the β-SiC. The larger the amount of α-SiC used, the lower is the density of the sintered product. Amounts of α-SiC ranging from 1% by weight to 3% by weight based on the β-SiC produce the finest and most uniform microstructures. Amounts of α-SiC powder larger than 5% by weight are likely to produce a sintered product having a density lower than 80%, and amounts of α-SiC smaller than 0.05% by weight do not provide sufficient nuclei for grain growth control.

The α-SiC powder is admixed with α-SiC powder alone, or with β-SiC powder containing the boron additive and/or carbonaceous additive to produce a homogeneous dispersion. Specifically, the α-SiC should be dispersed through the β-SiC powder substantially uniformly in order to produce a sintered product with the desired uniform microstructure.

The α-SiC powder can be admixed with the β-SiC powder by a number of techniques such as, for example, ball milling or jet milling, to attain the necessary uniform distribution and produce a substantially homogeneous dispersion.

One technique for introducing α-SiC powder into β-SiC powder utilizes milling balls formed of silicon carbide containing α-SiC in significant amount, i.e. at least 10% by weight. In this technique β-SiC powder is milled with the SiC balls which introduce α-SiC seeds by wear due to milling. Milling is preferably carried out in a liquid dispersion. The amount of α-SiC introduced is controlled by controlling milling time. Introduction of the proper amount of α-SiC is determinable empirically. For example, in accordance with the present process, the resulting powder can be sintered and the product sectioned and examined metallographically. The proper amount of α-SiC has been introduced in accordance with the present invention when the product has a significantly uniform microstructure, contains α-SiC in an amount of at least 70% by weight of the total amount of SiC and has a density of at least 80% of the theoretical density for SiC.

The boron additive in the powder mixture from which the green body is shaped is in the form of elemental boron or boron carbide. In order to obtain significant densification during sintering, the amount of boron additive is critical and is equivalent to about 0.3% to about 3.0% by weight of elemental boron based on the total amount of silicon carbide. The particular amount of boron additive used is determinable empirically and depends largely on the degree of dispersion achieved in the mixture since the more thoroughly it is dispersed the more uniform is the density of the sintered product. However, amounts of elemental boron below 0.3% by weight do not result in the necessary degree of densification whereas amounts of elemental boron greater than 3.0% by weight produce no significant additional densification and may deteriorate the oxidation resistance of the product. During sintering, the boron additive enters into solid solution with the silicon carbide. In addition, generally when amounts of the additive in excess of that equivalent to about 1% by weight of elemental boron are used, a boron carbide phase also precipitates.

The carbonaceous additive is used in an amount equivalent to 0.1% by weight to 1.0% by weight of free carbon based on the total amount of silicon carbide. Specifically, the carbonaceous additive is particulate free carbon of submicron size such as, for example, acetylene black, or a carbonaceous organic material which is heat-decomposible to produce particulate free carbon of submicron size in the required amount. In addition, the carbonaceous organic material is a solid or liquid at room temperature and completely decomposes at a temperature in the range of about 50° C to 1000° C to yield free carbon and gaseous products of decomposition. Also, the carbonaceous organic material is one which has no significant deteriorating effect on the silicon carbide, boron additive or the resulting sintered product.

To produce the present sintered product having a density of at least 80%, the oxygen content of the silicon carbide powder should be less than 1% by weight of the total amount of silicon carbide used, and preferably, less than about 0.4% by weight. This oxygen content is determinable by standard techniques and generally, it is present largely in the form of silica.

The function of free carbon in the present process, is to reduce silica which always is present in silicon carbide powders in small amounts or which forms on heating from oxygen adsorbed on the powder surfaces. The free carbon reacts during heating with silica according to the reaction: $SiO_2 + 3C \rightarrow SiC + 2CO$. Silica, when present in the SiC powders in appreciable amounts, halts densification of silicon carbide completely so that little or no shrinkage, i.e. densification, is obtained.

The free carbon also acts as a getter for free silicon if present in the powders or if it is formed by the following reaction during heating up to the sintering temperature: $SiO_2 + 2SiC \rightarrow 3Si + 2CO$. The presence of silicon, just as the silica, tends to halt or retard densification of SiC.

The specific amount of submicron free carbon required in the present process depends largely upon the oxygen content in the starting SiC powder and ranges from about 0.1% to 1.0% by weight of the total amount of silicon carbide used. Specifically, green bodies of the present invention which contain about 1% by weight of free carbon that do not sinter also will not sinter with amounts of free carbon significantly in excess of 1% by weight to a density of at least 80%. Also, amounts of free carbon significantly in excess of 1% by weight function much like permanent pores in the sintered product limiting its ultimate achievable density and strength.

Free carbon in the form of a submicron powder can be admixed with the silicon carbide powder by a number of conventional techniques such as, for example, jet milling or ball milling in a liquid dispersion.

In carrying out the present process, the carbonaceous organic material can be introduced by a number of techniques and heat-decomposed before or after the green body is formed. If the carbonaceous organic material is a solid, it is preferably admixed in the form of a solution with the silicon carbide powder and boron additive to substantially coat the particles. The wet mixture can then be treated to remove the solvent, and the resulting dry mixture can be heated to decompose the carbonaceous organic material producing free carbon in situ before the mixture is formed into a green body. If desired, the wet mixture can be formed into a green body and the solvent removed therefrom. In this way, a substantially uniform coating of the organic material on the silicon carbide powder is obtained which on decomposition produces a uniform distribution of free carbon. The green body is then heated to decompose the carbonaceous organic material to produce free carbon in situ and diffuse away gaseous products of decomposition before sintering initiates. The solvent can be removed by a number of techniques such as by evaporation or by freeze drying, i.e. subliming off the solvent in vacuum from the frozen dispersion. Likewise, if the carbonaceous organic material is a liquid, it can be admixed with the silicon carbide powder and boron additive, and the wet mixture heated to decompose the organic material and form free carbon, or the wet mixture can be formed into a green body which is then heated to decompose the organic material to form free carbon in situ and diffuse away gaseous products of decomposition. The heat-decomposition of the carbonaceous organic material should be carried out in an atmosphere in which the components being heated are substantially inert or which has no significant deteriorating effect on the components being heated such as argon or a vacuum. Preferably, the carbonaceous organic material in the green body is heat-decomposed in the sintering furnace as the temperature is being raised to sintering temperature.

High molecular weight aromatic compounds are the preferred carbonaceous organic materials for making the carbon addition since they ordinarily give on pyrolysis the required yield of particulate free carbon of submicron size. Examples of such aromatic compounds are a phenol-formaldehyde condensate-novolak which is soluble in acetone or higher alcohols, such as butyl alcohol, as well as many of the related condensation products, such as resorcinol-formaldehyde, aniline-formaldehyde, and cresolformaldehyde. Another satisfactory group of compounds are derivatives of polynuclear aromatic hydrocarbons contained in coal tar, such as dibenzanthracene and chrysene. A preferred group of carbonaceous additives are polymers of aromatic hydrocarbons such as polyphenylene or polymethylphenylene which are soluble in aromatic hydrocarbons and yield on heat-decomposition up to 90% of free carbon.

Another approach to improved carbon distribution on a submicron particle size level is the application of jet milling. The silicon carbide powder is soaked with a solution of, for instance, a novolak resin in acetone, dried in air and heated up to 500° C to 800° C in nitrogen to pyrolyze the resin. The actual amount of carbon introduced by this process is determined as weight gain after the pyrolysis or by analysis of free carbon. The powder with the added carbon is then jet milled which greatly improves the distribution of carbon and eliminates major carbon grains in the sintered product.

A number of techniques can be used to shape the powder mixture into a green body. For example, the powder mixture can be extruded, injection molded, die-pressed isostatically pressed or slip cast to produce the green body of desired shape. Any lubricants, binders or similar materials used in shaping the powder mixture should have no significant deteriorating effect on the green body or the resulting sintered body. Such materials are preferably of the type which evaporate on heating at relatively low temperatures, preferably below 200° C, leaving no significant residue. The green body, preferably, should have a density of at least 45% of the theoretical density for silicon carbide to promote densification during sintering and achieve attainment of the desired density of at least 80%.

Sintering of the green body is carried out in an atmosphere in which it is substantially inert, i.e. an atmosphere which has no significant deteriorating effect on its properties such as, for example, argon, helium or a vacuum. The sintering atmosphere can range from a substantial vacuum to atmospheric pressure.

Sintering is carried out at a temperature ranging from about 1950° C to about 2300° C. The particular sintering temperature is determinable empirically and depends largely on particle size, density of the green body, and final density desired in the sintered product with higher final densities requiring higher sintering temperatures. Also, lower sintering temperatures would be used with sintering atmospheres below atmospheric pressure. Specifically, the smaller the size of the particles in the green body and the higher its density, the lower is the required sintering temperature. Sintering temperatures lower then 1950° C do not produce the present sintered bodies with a density of at least 80%. Temperature higher than 2300° C can be used since the present process provides sufficient grain growth control but the use of temperatures significantly higher than 2300° C provide no particular advantage and bring about evaporation of silicon carbide.

The sintered body of the present invention has a density ranging from 80% to about 95% of the theoretical density for silicon carbide. The product is composed of silicon carbide, boron or boron and boron carbide, and free elemental carbon. The composition of the silicon carbide in the present product ranges from α-SiC alone to a composition composed of 70% by weight α-SiC and 30% by weight β-SiC. The α-SiC is present in the form of a substantially uniform microstructure in the form of elongated grains or platelets which, in the long dimension, may range from about 5 microns to about 150 microns with an average length ranging from about 10 microns to 30 microns, and preferably have a grain size of from about 5 microns to 25 microns in the long dimension with an average length of about 10 microns. The β-SiC is present in the form of fine grains ranging from about 1 micron to about 10 microns with an average grain size of about 3 microns. The boron is present in an amount ranging from 0.3% by weight to 3% by weight based on the total amount of silicon carbide. The boron is in solid solution with the β-and α-silicon carbides and also may be present as a boron carbide phase in a very fine-sized precipitated form detectable by X-ray analysis. The boron or boron and boron carbide are substantially uniformly distributed throughout the sintered body. The sintered body also contains from 0.1% to 1% by weight of free carbon based on the total amount of silicon carbide. The free carbon is in the form of particles, substantially submicron in size, which are substantially uniformly distributed throughout the sintered body.

Since the present sintered product has a substantially stable microstructure, it retains its room temperature shape and mechanical properties at high temperatures. Specifically, the sintered product undergoes no significant change in density or mechanical properties after substantial exposure in air to temperatures ranging up to about 1700° C. and after substantial exposure in an atmosphere in which it is substantially inert such as argon to temperatures above 1700° C ranging up to about 2300° C. Such properties make it particularly useful for high temperature structural applications such as gas turbine blades. Although, at temperatures of 2000° C or higher, β-SiC in the present sintered product will transform to α-SiC, the newly formed α-SiC grains cannot grow significantly because they impinge on and are blocked by the substantial number of α-SiC grains already present substantially uniformly throughout the product. As a result, any additional transformation of β-SiC has no significant effect on shape or mechanical properties of the product.

The present invention makes it possible to fabricate complex shaped polycrystalline silicon carbide ceramic articles directly which heretofore could not be manufactured or which were produced by expensive and tedious machining because of the hardness of the material. The present sintered product requires no machining and it can be made in the form of a useful complex shaped article, such as a gas turbine airfoil, an impervious crucible, a thin walled tube, a long rod, a spherical body, or a hollow shaped article such as a gas turbine blade. Specifically, the dimensions of the present sintered product differ from those of its green body by the extent of shrinkage, i.e. densification, which occurs during sintering. Also, the surface characteristics of the sintered body depend on those of the green body from which it is formed, i.e. it has a substantially smooth surface if the green body from which it is formed has a smooth surface.

The invention is further illustrated by the following Examples which, unless otherwise noted, were carried out as followed:

All sintering and firing was carried out in a carbon-element resistor furnace by bringing the furnace up to sintering or firing temperature in about 1 hour, holding at sintering or firing temperature for 20 minutes, shutting the furnace off and furnace-cooling to room temperature.

β-SiC powder used had an average particle size of 0.17 micron.

α-SiC powder used had an average particle size of 0.32 micron.

The powder dispersion was pressed into a green body in the form of a cylinder, 1.5 cm × 1.5 cm, which had a density of 55% of the theoretical density for silicon carbide.

% Density given herein is fractional % of the theoretical density for silicon carbide.

Sintered and fired products were subjected to metallographic analyses and X-ray analyses.

EXAMPLE 1

A carbon-rich silicon carbide powder prepared by a pyrolytic process was used. Specifically, it was a powder dispersion, submicron in size, consisting essentially of cubic β-silicon carbide with free carbon uniformly and intimately dispersed therein in an amount of 0.35% by weight of the β-SiC. The β-SiC contained 0.17% by weight $O_2$, had an average particle size of 0.17 micron and a surface area of 9.2 $m^2/g$. This powder dispersion was ball milled with particles of amorphous elemental boron of submicron size to produce a uniform powder dispersion containing 0.4% by weight boron based on the β-SiC. A portion of the resulting powder dispersion was pressed into a cylinder which was sintered in argon at a temperature of 2020° C. The resulting sintered product was examined and the results are shown as Example 1 in Table I. Specifically, the sintered product had a uniform microstructure of β-SiC such as that shown in FIG. 1.

EXAMPLE 2

The sintered product of Example 1 was fired at a temperature of 2080° C.

Examination of the resulting product showed that raising the temperature from 2020° C to 2080° C resulted in a 4% transformation into α-SiC, which phase appeared in the form of large plates, 20 times larger than the average grain size of the β-SiC matrix.

EXAMPLE 3

The product of Example 2 was fired at a temperature of 2150° C.

Figure 2:
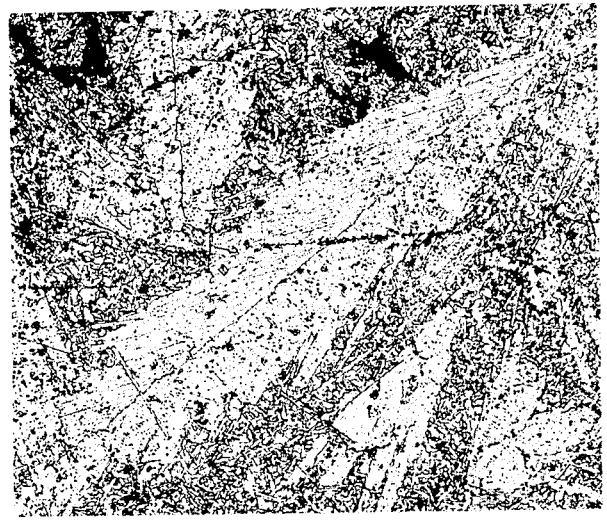
FIG. 2 is a photomicrograph (magnified 500 ×) of an etched specimen of the same initial composition as FIG. 1 sintered at 2150° C showing a feather-like morphology of large grains of $\alpha$-SiC polytypes in a matrix of $\beta$-SiC.

Examination of the resulting product showed that this further increase in temperature resulted in a high degree of conversion to α-SiC accompanied by catastrophic exaggerated grain growth of huge α-grains of feather-like morphology as shown in FIG. 2. This microstructure development is manifested by a substantial decrease in strength as shown by additional specimens which were prepared in the form of bars 4 mm × 4 mm × 40 mm according to Example 2 and which had at room temperature in three point bending a modulus of rupture, i.e. strength, of 80,000 psi, and which after firing at a temperature of 2150° C showed a modulus of rupture of 40,000 psi.

EXAMPLE 4

This example illustrates the present invention utilizing α-SiC.

The procedure used in this example was the same as set forth in Example 1 except as shown in Table I.

To prepare the submicron α-SiC, abrasive grade silicon carbide, 325 mesh grit, was milled in an aqueous dispersion in a steel jar with steel balls for 50 hours. The product was then repeatedly leached with concentrated HCl and washed with distilled water until all iron contamination due to ball wear was removed, filtered and dried. The resulting powder was dispersed in water to obtain a 2% dispersion which was stabilized by the addition of 1 cc sodium silicate solution per 500 g. of SiC. The liquid was left standing for all particles of about one micron or larger to settle. The dispersion was siphoned off and the submicron SiC was recovered from the dispersion by an addition of nitric acid to obtain pH3, filtered and dried. The resulting powder contained particles ranging up to 1 micron.

The resulting submicron powder was characterized and found to consist essentially of α-SiC with 0.2% by weight $O_2$ and 0.2% by weight of free carbon. The α-SiC particles had a surface area of 5.5 $m^2/g$, an average particle size of 0.32 micron and X-ray analysis showed it to be composed of α-SiC polytypes 6H, 15R (4H,3C).

A portion of the powder dispersion prepared in Example 1, which consisted essentially of β-SiC, and based on the β-SiC, 0.35% by weight free carbon and 0.4% by weight boron, was used in this example. To this dispersion there was added the α-SiC having an average size of 0.32 micron in an amount of 0.1% by weight based on the amount of β-SiC. The resulting mixture was ball milled in benzene in a plastic jar with cemented balls. After 5 hours of milling, the benzene was removed by evaporation and the resulting powder was pressed into a green cylinder which was sintered at 2080° C. The resulting sintered product was examined and found to have a uniform microstructure. The results as shown in Table I illustrate that the addition of only 0.1% of α-SiC to the starting powder brought about a high degree of conversion to α-SiC on sintering at 2080° C which α-SiC phase crystallized in the form of a uniform network of platelet-like grains.

EXAMPLE 5

The sintered product of Example 4 was fired at 2180° C.

Examination of the resulting product showed that although additional α-SiC phase formed after firing at 2180° C, the platelet-like grains of the product of Example 4 grew relatively very little, i.e. to 48 microns, and that the microstructure retained its uniformity.

EXAMPLE 6

The product of Example 5 was fired at 2250° C.

Examination of the resulting product showed that although still additional α-SiC phase formed after firing at 2250° C, the average α-SiC grain size grew very little, i.e. to 67 microns, which illustrates the stability of the microstructure of the present sintered product to temperature fluctuation.

EXAMPLES 7-9

In these examples, which also illustrate the present invention, the procedure and materials used were the same as set forth in Example 3 except as shown in Table I.

The green body of Example 9 consisted essentially of β-SiC, 5% by weight of α-SiC based on the β-SiC, and based on the total amount of SiC about 0.35% by weight of free carbon and about 0.38% by weight of boron.

It can be seen from Examples 4 to 9 in Table I, which illustrate the present invention, that the addition of α-SiC results in a lower terminal density of the sintered product which cannot be further increased significantly by increasing the sintering temperature. Table I illustrates that the terminal density obtained on sintering is determined by the amount of α-SiC used for seeding as demonstrated by Examples 4, 7, 8 and 9 where increases in the amount of α-SiC resulted in decreases in terminal densities.

Also, the sintered or fired products of Examples 4 to 9 showed particles of free carbon, substantially submicron in size, and present in an amount of less than about 0.5% by weight of the total amount of silicon carbide distributed substantially uniformly throughout each product. Also, analysis showed the boron to be in solid solution with the silicon carbide substantially uniformly throughout the product. In addition, the sintered cylinders had a smooth surface since the green bodies from which they were formed had a smooth surface.

EXAMPLE 10

The β-silicon powder used in this example was the same as that used in Example 1 except that it contained 0.05% by weight of free carbon. This powder was mixed with, submicron in size particles and based on the amount of β-SiC, 0.3% by weight of acetylene black and 0.4% by weight of amorphous boron. The mixture was ball milled in a solution of 1 g. of polyethyleneglycol per 100 cc of benzene. 200 cc of the solution was used per 100 g. of the powder mixture. After 5 hours milling with cemented carbide balls the slurry was spray-dried.

A portion of the resulting ball milled powder was pressed into cylinders which were sintered in argon at 2130° C. The sintered cylinders were subjected to X-ray diffraction analysis and found to consist on the average of 80% by weight β-SiC and 20% by weight α-SiC. The microstructure was characterized by large feather-like α-SiC crystals in a fine-grained β-SiC matrix and the density was 95.5% of theoretical.

These SiC sintered cylinders were used as grinding balls with the remaining portion of the ball milled β-SiC powder mixture to introduce α-SiC into the powder mixture by wear of the cylinders. After 8 hours, the resulting α-SiC containing powder was pressed into pellets which were sintered under the same conditions at 2130° C in argon. The sintered pellets had a density of 93.5%, a phase composition which was 100% α-SiC and

TABLE I

| | | SINTERING | | SINTERED OR FIRED PRODUCT | | | | |
|---|---|---|---|---|---|---|---|---|
| Ex. No. | % by wt. α-SiC added based on β-SiC | Atmosphere | Temperature (° C) | Density % | β-SiC Mean Avg. Grain Size(μ) | α-SiC* Avg. Grain Size(μ) | Microstructure | α-SiC % by wt. of SiC |
| 1 | none | Argon | 2020 | 88.0 | 1.7 | — | uniform | 0 |
| 2 | Sintered product of Ex. 1 used. | " | 2080 | 94.0 | 2.6 | 50+ | some nonuniformity plates of α-SiC | 4 |
| 3 | Fired product of Ex. 2 used. | " | 2150 | 96.5 | 3.5 | 500+ | "feathers" of α-SiC | 72 |
| 4 | 0.1 | Vacuum (0.2 torr) | 2080 | 89.4 | — | 30 | uniform | 72 |
| 5 | Sintered product of Ex. 4 used. | " | 2180 | 91.9 | — | 48 | uniform | 98 |
| 6 | Fired product of Ex. 5 used. | " | 2250 | 91.0 | — | 67 | uniform | 100 |
| 7 | 0.5 | Argon | 2110 | 84.5 | — | 35 | uniform | at least 70 |
| 8 | 1.0 | " | 2110 | 83.0 | — | 34 | uniform | at least 70 |
| 9 | 5.0 | " | 2110 | 81.0 | — | 29 | uniform | at least 70 |

*The longest dimensions of the sectioned α-grains are averaged here.
+ Largest grains observed in section.

a substantially uniform microstructure composed of a network of platy α-SiC crystals.

Figure 3:
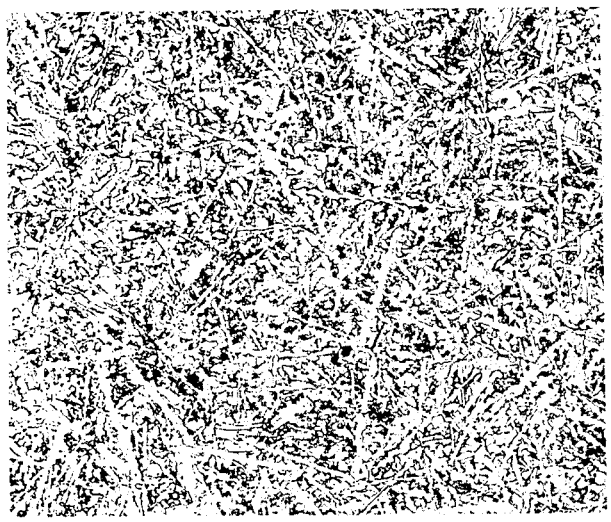
FIG. 3 is a photomicrograph (magnified 500 ×) of an etched specimen prepared in accordance with the present invention sintered at 2175° C showing a substantially uniform microstructure of $\alpha$-SiC.

These sintered pellets were then fired at 2175° C in argon. The resulting pellets showed the same microstructure as obtained at 2130° C. The α-SiC crystals were about 40 microns long and are shown in FIG. 3. This illustrates that the exaggerated grain growth observed in the sintered pellets processed with cemented carbide balls containing no α-SiC could be eliminated entirely by the present invention.

What is claimed is:

1. A method of producing a silicon carbide sintered body having temperature-resistant properties which comprises providing a substantially homogeneous submicron particulate mixture consisting essentially of silicon carbide composed of β-SiC and from 0.05% to 5% by weight of α-SiC based on said β-SiC, said β-SiC particles having an average particle size ranging up to 0.45 micron and said α-SiC particles having a particle size of at least about twice as large as that of said β-SiC particles, an amount of boron additive selected from the group consisting of boron and boron carbide equivalent to 0.3% to 3.0% by weight of boron based on the total amount of silicon carbide, and an amount of a carbonaceous additive selected from the group consisting of free carbon and a carbonaceous organic material equivalent to 0.1% to 1.0% by weight of free carbon based on the total amount of silicon carbide, said carbonaceous organic material completely decomposing at a temperature ranging from about 50° C to 1000° C to said free carbon and gaseous products of decomposition, shaping the mixture into a green body, and sintering the green body at a temperature ranging from about 1950° C to 2300° C in an atmosphere in which it is substantially inert at atmospheric pressure or below atmospheric pressure to produce a sintered body having a density of at least 80% of the theoretical density for silicon carbide and containing α-SiC in an amount of at least 70% by weight of the total amount of silicon carbide.

2. A method according to claim 1 wherein said green body is prepared by slip casting.

* * * * *